Figure 1:
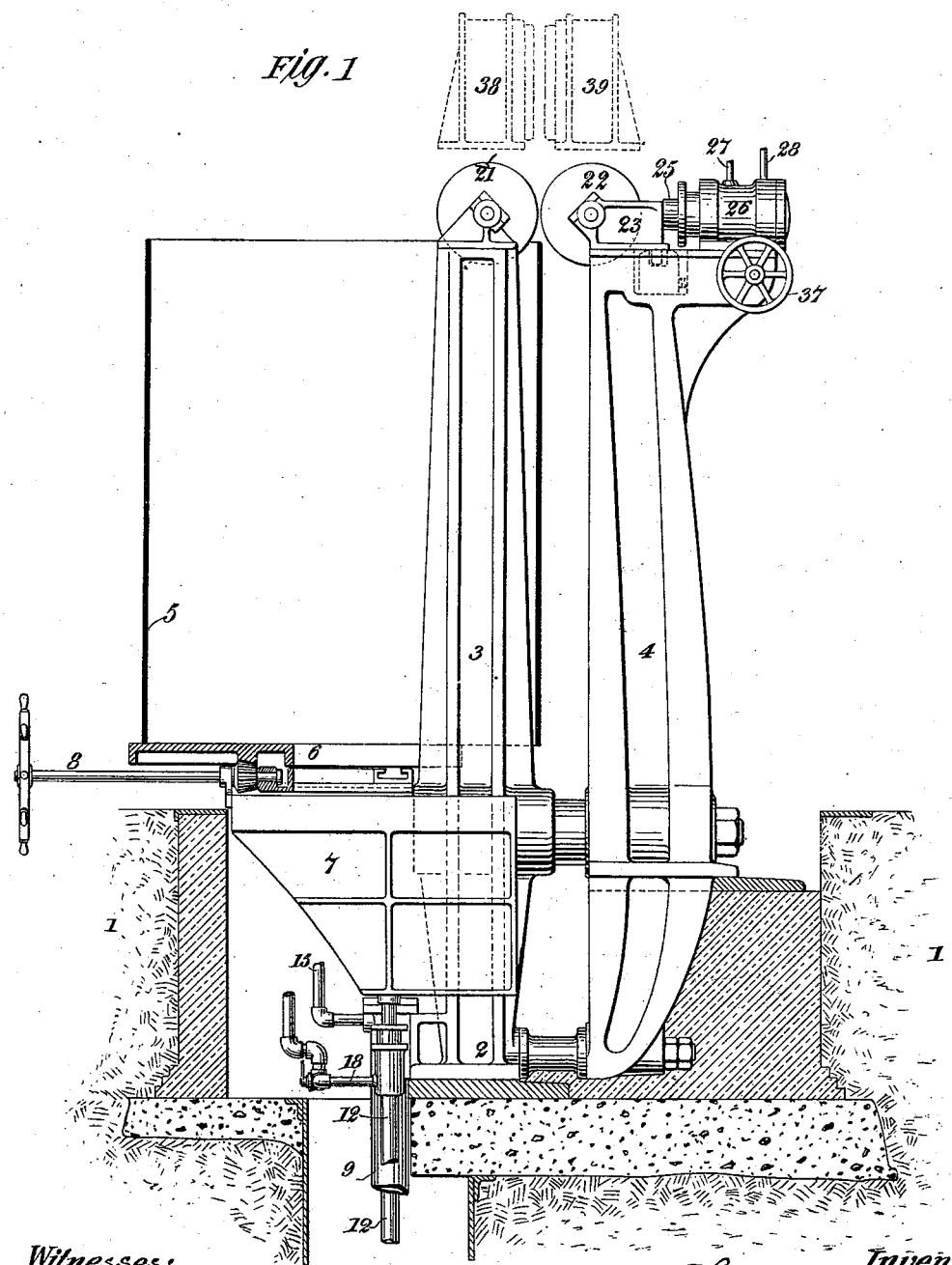

(No Model.)     T. F. ROWLAND.     4 Sheets—Sheet 2.
TUBE WELDING MACHINE.

No. 547,940.     Patented Oct. 15, 1895.

Witnesses:
Raphaël Netter
Robt. F. Gaylord

Inventor
Thomas F. Rowland,
by Duncan & Page,
Attorneys.

(No Model.) T. F. ROWLAND. 4 Sheets—Sheet 3.
TUBE WELDING MACHINE.

No. 547,940. Patented Oct. 15, 1895.

Witnesses:
Raphael Netter
Robt. F. Gaylord

Inventor
Thomas F. Rowland,
by Duncan & Page
Attys.

(No Model.) T. F. ROWLAND. 4 Sheets—Sheet 4.
TUBE WELDING MACHINE.
No. 547,940. Patented Oct. 15, 1895.
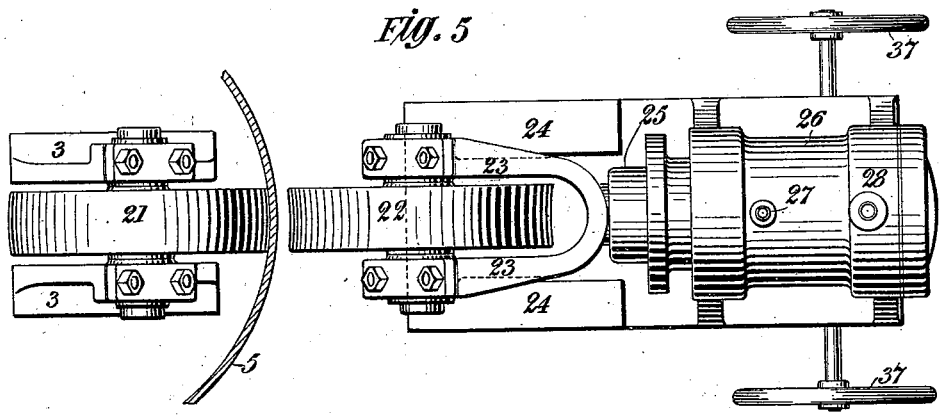
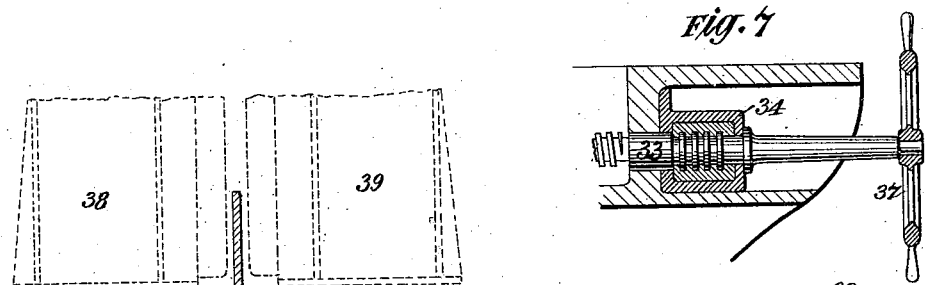
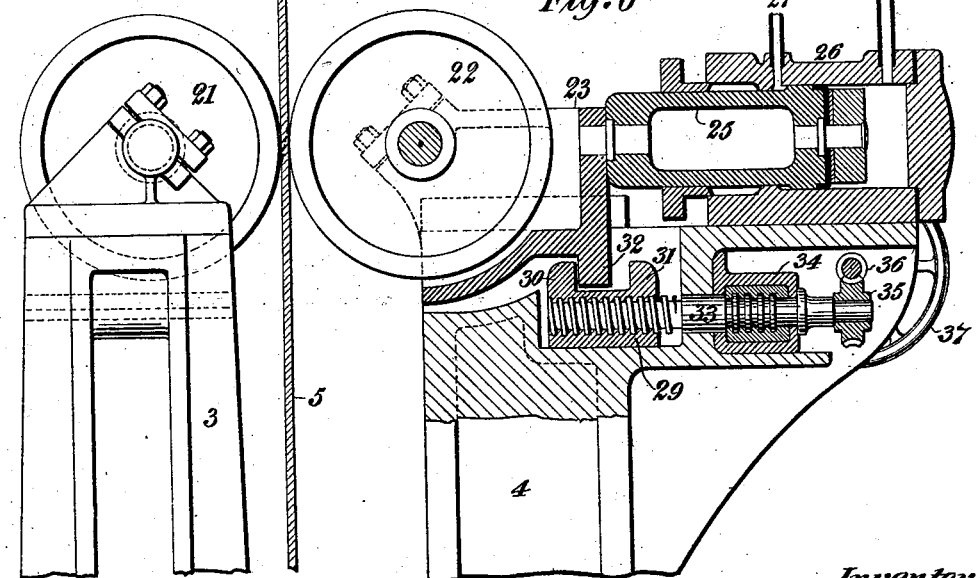
Witnesses:
Raphaël Netter
Robt. F. Gaylord
Inventor
Thomas F. Rowland,
by Duncan Page
Attorneys.

UNITED STATES PATENT OFFICE.

THOMAS F. ROWLAND, OF NEW YORK, N. Y.

TUBE-WELDING MACHINE.

SPECIFICATION forming part of Letters Patent No. 547,940, dated October 15, 1895.

Application filed July 5, 1894. Serial No. 516,546. (No model.)

*To all whom it may concern:*

Be it known that I, THOMAS F. ROWLAND, a citizen of the United States, residing at New York, in the county of New York and State of New York, have invented certain new and useful Improvements in Tube-Welding Machines, of which the following is a specification, reference being had to the drawings accompanying and forming a part of the same.
The present invention relates, generally, to machines for welding, especially for welding plates together in the form of tubes or cylindrical or other vessels of various sizes and shapes, the particular machinery herein shown and described being especially adapted to the welding together of heavy plates of metal and in the form of large cylindrical structures. In this mechanism the welding devices consist of a pair of oppositely-arranged and conjointly-acting welding-rolls mounted one on each of the free ends of a pair of rigidly-connected parallel bars or arms, which bars or arms are supported at their other ends from a suitable base, and in the present instance these arms are arranged vertically. Upon these arms is mounted a vertical movable carriage bearing a blank table, which is angularly adjustable on the carriage and which supports and holds the blank to be welded, and is the means for reciprocating the same between the welding-rolls. In suitable position, either borne upon such arms or otherwise arranged in proximity to the welding-rolls, is a pair of heating-furnaces. The arrangement of the parts is such that a blank—for instance, a cylindrical blank having its edges overlapping to form a longitudinal seam—may be presented to the furnaces so that both sides of the seam parts can be simultaneously heated, and after being properly heated the blank can be withdrawn from between the furnaces and forced between the welding-rolls, the blank-carrying table of course being adjusted and manipulated to accomplish these various motions. One form of such machine is illustrated in the United States Patent No. 468,009, dated February 2, 1892, granted to T. F. Rowland, Jr.

The present improvements relate particularly to improved means for adjusting the welding-rolls relatively—that is to say, it is desirable that the rolls have a maximum welding pressure and that they be held to uniform contact on the seam when in action, whereby to effect the desired welding compression of the seam parts and at the same time be prevented from effecting an excessive reduction of the thickness of the parts at the seam. These welding-rolls are usually manipulated by means of hydraulic mechanism, and in the said patent is shown a hydraulic cylinder and piston mechanism designed to move one roll to and from the other; but the motion of the movable roll is limited by the throw of the hydraulic piston in its cylinder, and no means is shown whereby to adjust such throw. Also, it will be seen that to completely withdraw the movable roll from its companion it is necessary to practically empty the cylinder, which means, to a certain extent, a waste of the power fluid.

In the present mechanism one feature of invention consists of an adjustable mechanism adapted to limit the throw of the movable welding-roll piston in such manner that the piston will not at any time have an excessive stroke and in such manner that the stroke of the piston may be readily adjusted to suit the conditions of various thicknesses of metal to be welded. In this kind of mechanism, also, particularly as shown in the said patent, it has been common to employ a suitable hydraulic mechanism for the purpose of working the blank-carrying table. As is well understood, the power necessary to work this table will vary in accordance with the size and thickness of the blank, and therefore a hydraulic mechanism suitable for operating this table with a very heavy blank thereon is unnecessarily large, and its operation more or less correspondingly wastes the pressure fluid power when the table is used for vertically operating a blank of smaller size and lighter weight.

Another feature of the invention relates to the use in such a welding mechanism of a plurality of elevating-rams, the arrangement and combination of these rams being such that when the power of one is not sufficient to properly manipulate the blank one or more rams may be brought into operation to act conjointly upon the blank.

Figure 2:
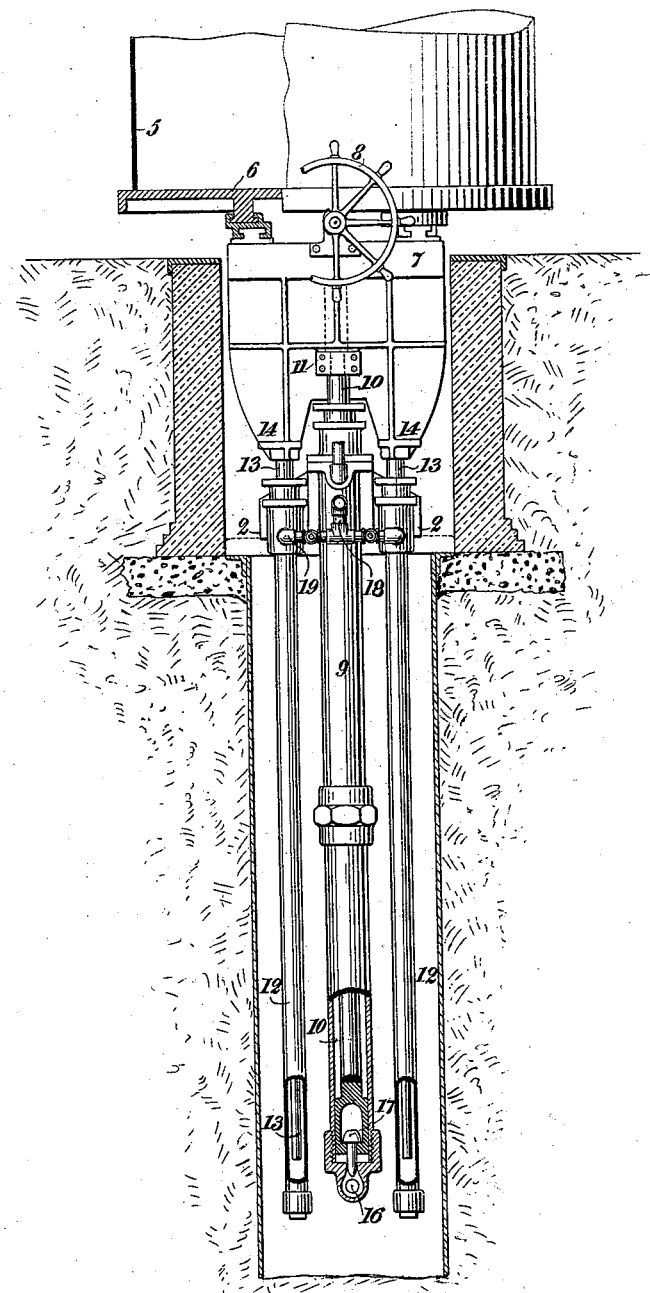
Figure 3:
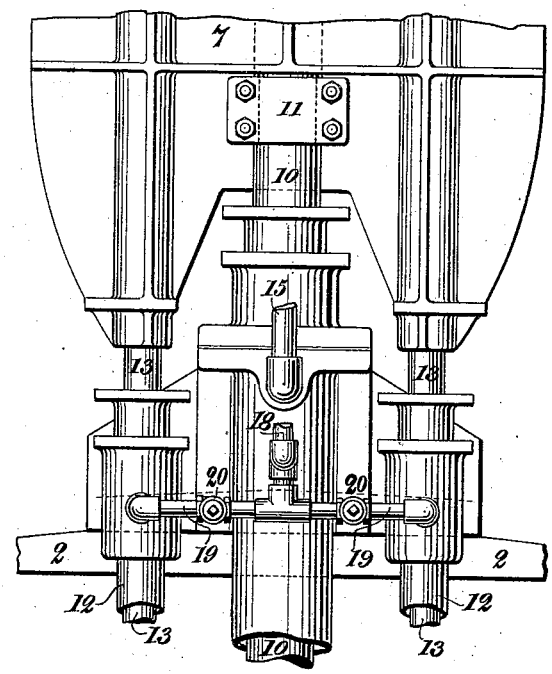
Figure 4:
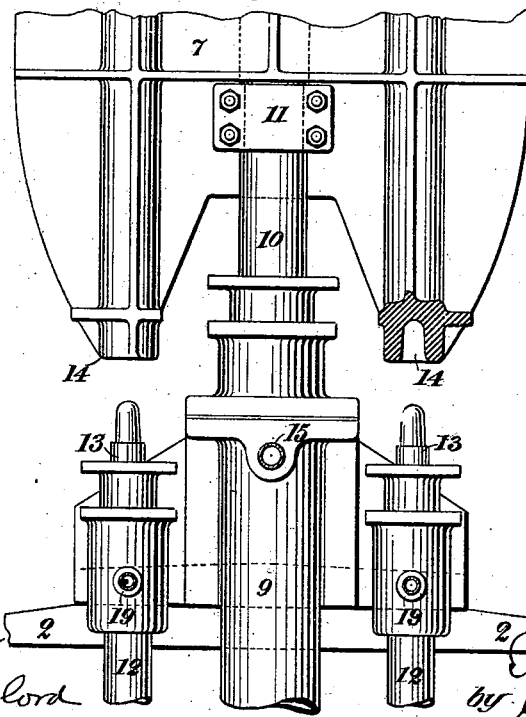

Referring to the drawings accompanying this specification, Figure 1 is an elevation view of one form of mechanism embodying my improvements, the hydraulic elevating-rams being partially broken away. Fig. 2 shows a side elevation, looking from the left of Fig. 1, of the ram mechanism of such a welding-machine and showing particularly the blank-elevating carriage and table, the welding arms and rolls as seen in Fig. 1 being omitted. Fig. 3 is an enlarged detail view of portions of the elevating-carriage and the ram mechanism, the three rams illustrated being shown in operable connection with the carriage as when the latter is about to be started. Fig. 4 is a similar view, except that the table is shown slightly raised by the middle or main ram, while the supplemental or side rams are shown as not in operation. Fig. 5 is an enlarged plan view of the welding-rolls and their supporting parts, together with the mechanism for operating the movable roll. Fig. 6 is a detailed side view of the same parts, the operating-piston and its cylinder of the movable roll being shown in lengthwise central section. Fig. 7 is a modification of the hand-wheel mechanism for operating the adjusting parts of the movable roll.

Referring to the views in detail the numeral 1 represents the masonry and groundwork surrounding and supporting the machine. 2 is the main foundation or base of the machine, to which is attached the two arms or bars 3 and 4, these being separated above the general level by a space suitable to the manipulation of the blank. 5 represents such a blank, which is shown to be a cylindrical tube, which may be formed by bending a sheet of metal into cylindrical form with its edges overlapping. This blank is secured to and supported upon a table 6, carried on the carriage 7, which is mounted upon the upright arm 3, so as to have vertical motion along the same, while yet held rigidly in relation thereto, whatever may be the position of this along the length of the arm. The table has angular motion on the carriage to rotate the tube or blank relatively to the arm 3, the hand-wheel 8 being employed for this purpose, and it also has motion to and from the arm in a horizontal plane. The specific construction and the means of operating this table are more particularly described in said United States Patent No. 468,009.

Properly supported on the base of the machine or otherwise in fixed relation thereto is the main hydraulic cylinder 9, the differential piston 10 of which is secured to the carriage by the socket 11. Upon each side of this hydraulic ram is located the supplemental hydraulic-ram cylinders 12, the floating pistons 13 of which are in axial line with the sockets 14 on carriage 7.

15 and 16 indicate pipes by which the main ram is supplied with fluid pressure and by which the same is exhausted from this ram. At the lower end of the piston 10 of this ram is located a plunger-valve 17, adapted to close the exit communication when the plunger descends and before the same reaches the lower end of the ram-cylinder. This is for the purpose of preventing injury to the mechanism in case the ram-piston be allowed to too rapidly descend, as in the event of the rupturing of the pressure-fluid pipes or for other like or similar reasons. The action of this safety-valve is fully and specifically described in the Patents Nos. 488,836 and 488,837, issued to me on the 27th day of December, 1892. The supplemental rams 12 may be likewise provided with such safety-valve mechanism.

18 is the pipe which supplies and exhausts pressure fluid through branch pipes 19 to and from the supplemental rams 12, intermediate cocks 20 being provided, whereby communication with one or both of the rams is made or severed. Thus at the will of the operator the pressure-supply may be admitted to any one or two or to all three of the rams, in accordance with the amount of lifting pressure that it is found necessary to have in manipulating the blank-carriage.

21 and 22 indicate the welding-rolls, the first being pivotally mounted in fixed journals on the arm 3, and the other roll is pivotally mounted in the laterally-adjustable slide 23. This slide moves in suitable guides 24 on the upper end of the arm 4 and horizontally to the length of this arm or at right angles to the blank. The slide 23 is fixedly attached to the hydraulic piston 25, moving in the cylinder 26, also fixed upon the upper end of the arm 4.

27 and 28 are the pipes which supply this cylinder with the fluid pressure for the purpose of projecting and retracting the welding-roll 22.

29 is a slide-block movable in a suitable socket or way in the framework of the upper end of arm 4 and bearing two stops 30 and 31, separated by a space representing that necessary to the proper manipulation of the thickest blank likely to be worked upon this machine. Between these stops projects the lug 32 on the slide 23. The screw 33 is threaded in the block 29 and is rotatably held against longitudinal motion in the thrust-block 34. The outer end of this screw bears a gear 35, meshing with the worm 36 on the shaft of the hand-wheel 37, or such hand-wheel may be on the screw-shaft, as seen in Fig. 7. Rotating this hand-wheel will cause the screw to be turned and the adjustable block 29 moved in its socket, and correspondingly the stops 30 and 31 of the movable welding-roll will be correspondingly adjusted with relation to the fixed welding-roll. It will now be plain that suitable pressure applied behind the piston 25 will project the welding-roll 22 toward the fixed welding-roll, but that the forward movement of the latter roll will be limited by the stops 30, it being understood that the adjustment is to be such as will maintain the proper separation of the welding-rolls with relation to the amount of compression it is desired to effect upon the seam parts of the blank being welded. In like manner the admission of fluid pressure behind this piston will cause the same to be retracted, as also the movable welding-roll; but such retraction will be limited by the stops 31, the position of which is in correspondence with the desired space between the welding-rolls, as when the blank is to be moved vertically or angularly in a horizontal plane. It is to be noted that the piston of this movable welding-roll upon retraction does not move to the bottom of its cylinder, and therefore the motive fluid need only be exhausted from the cylinder to such an extent as will effect the required movement of the piston. In other words, there is no waste of the motive fluid beyond that necessary to effect the proper motion of the movable welding-roll.

38 and 39 represent two heating-furnaces, these being preferably located just above the welding-rolls, which furnaces may be secured upon the upper end of the arms 3 and 4 or may be held in position by other suitable suspending or supporting devices.

The operation of the mechanism will now be plain. Assuming that the blank is properly secured to and adjusted upon the elevating-table, pressure admitted to the main ram will elevate such carriage, so as to bring a portion of the seam parts of the cylinder to between the heating-furnaces. After these seam parts have been properly heated the lowering of the blank-carriage will bring the heated seam between the welding-rolls, whereupon the movable roll may be advanced to proper welding position and the blank-carriage reciprocated to force and draw the blank between the welding-rolls and thereby effect the union of the overlapping edges or seam parts of the same. During these operations the blank-carriage may be angularly turned or vertically moved, as the requirements of the welding steps demand, and if it be desired one or more of the blank-carriage rams may be brought into operation to put more or less power upon the carriage.

I am aware that it is not new, especially as suggested in the said Patent No. 468,009, to operate the movable welding-roll by hydraulic pressure. The essential feature of this mechanism, however, and in these particular regards, is the employment of adjustable stops limiting the movement in both directions of the movable welding-roll, so as to confine the same to an excursion or range of motion best adapted to effect the proper welding action and at the same time to limit or prevent such excessive motion as might result in a waste of the motive fluid. Also, I am aware that it is not new to employ a plurality of rams the pistons or operating parts of which are fastened to each other in such manner that when the piston-rod of one ram is operated the piston-rods of the other rams must also be moved. My invention relates to two or more rams which are disconnectedly arranged with relation to the blank-carrying carriage that they operate, so that one or more of the rams may be separately or conjointly applied to the carriage.

What is claimed as new is—

1. The combination in a welding machine, of two welding rolls arranged to conjointly operate upon opposite sides of a blank, mechanism for advancing and retracting one of said rolls relatively to the other, and an adjustable piece carrying stops adapted to limit the movement of the movable roll in both directions toward and from the other roll, for the purposes set forth.

2. The combination in a welding machine, of two welding rolls arranged to conjointly operate upon opposite sides of a blank, mechanism for advancing and retracting one of said rolls relatively to the other, and an adjustable stop limiting the movement in both directions of the said movable roll, and mechanism for effecting the adjustment of said stop, for the purpose set forth.

3. In combination in a welding machine and with a fixed and an adjustable welding roll, a blank carrying carriage, a main ram connected to said carriage, and one or more supplemental rams arranged to disconnectedly engage said carriage, and means substantially as described whereby said main ram can be caused to operate the carriage with or independently of said supplemental rams, for the purpose set forth.

THOMAS F. ROWLAND.

Witnesses:
WARREN E. HILL,
JAMES P. HALLETT.